United States Patent [19]

Iasillo et al.

[11] Patent Number: 4,949,538
[45] Date of Patent: Aug. 21, 1990

[54] COMBUSTOR GAS FEED WITH COORDINATED PROPORTIONING

[75] Inventors: Robert J. Iasillo, Guilderland; Stephen Fedor, Burnt Hills, both of N.Y.

[73] Assignee: General Electric Company, Schenectady, N.Y.

[21] Appl. No.: 276,594

[22] Filed: Nov. 28, 1988

[51] Int. Cl.⁵ ............................................. F23R 3/34
[52] U.S. Cl. .................................... 60/39.465; 60/733
[58] Field of Search ................... 60/39.465, 733, 732, 60/741, 746, 734; 137/819, 820, 101, 118

[56] References Cited

U.S. PATENT DOCUMENTS

| | | | |
|---|---|---|---|
| 3,064,903 | 11/1962 | Butler | 137/869 |
| 3,311,130 | 3/1967 | Caldwell | 137/869 |
| 4,027,473 | 6/1977 | Baker | 137/101 |
| 4,052,844 | 10/1977 | Carvel et al. | 60/733 |
| 4,112,676 | 9/1978 | DeCorso | 60/733 |
| 4,691,730 | 9/1987 | Portolese et al. | 137/101 |
| 4,735,052 | 4/1988 | Maeda et al. | 60/746 |

OTHER PUBLICATIONS

Fisher Catalog, pp. 1 and 6 (Nov. 1981); and pp. 2–5 (Aug. 1974).

Primary Examiner—Louis J. Casaregola
Assistant Examiner—Timothy S. Thorpe
Attorney, Agent, or Firm—Nixon & Vanderhye

[57] ABSTRACT

A coordinated valve splitter assembly includes a linear trim primary valve in parallel with an equal-percentage-trim valve to split fuel gas between primary nozzles and a secondary nozzle of a gas turbine combustor. In one embodiment, coordination of the actuation of the two valves is accomplished through rigid connection of the valve shafts. Shaped-cam and electronic actuation of the two valves is also disclosed.

5 Claims, 6 Drawing Sheets

COMBUSTOR GAS FEED WITH COORDINATED PROPORTIONING

BACKGROUND OF THE INVENTION

The present invention relates to combustors and, more particularly, to combustors using gaseous fuel and in which the gaseous fuel is premixed with air in a primary and a secondary zone. Combustion takes place only in the secondary zone.

Legal and environmental requirements mandate strict limits on NOx emissions of power-generation equipment. It is known that low combustion temperatures are required to attain low NOx emissions in gas turbines. The prior art contains relatively extreme measures to attain low NOx emissions. For example, it is conventional to add steam or water to the combustors of a gas turbine engine to reduce the reaction temperature therein. Although at least partially effective in reducing combustion temperature, the use of steam or water adds to the complexity of metering the proper amount thereof to the combustor, and reduces the combustor efficiency.

A further possibility includes selective catalytic reduction using a body of catalyst to encourage combustion at lower temperatures than are otherwise possible. In general, catalysts are expensive, and techniques for attaining efficient complete reaction with them are complex.

A still further possibility, and the one to which the present invention is directed, includes precisely premixing gaseous fuel and air prior to combustion. This permits combustion to take place at a lower temperature with consequent reduced NOx and CO emissions.

Extreme precision in the proportioning of gas fuel and air is required to attain the desired low emissions. The problem is compounded in a combustor wherein a primary mixing zone receives air and a portion of the fuel gas, and a secondary mixing zone receives air and the remainder of the fuel gas. Combustion takes place only in the secondary zone. Accurate metering of fuel gas is required in both the primary and secondary zones. In addition, precise proportioning of gas fuel between the primary and secondary zones is critical to low emissions. Errors in proportioning in the range of a few percent are sufficient to produce unacceptable levels of emissions. Such accuracies are difficult to attain with conventional techniques.

OBJECTS AND SUMMARY OF THE INVENTION

It is an object of the invention to provide a gas fuel metering system that overcomes the drawbacks of the prior art.

It is a further object of the invention to provide a gas fuel metering system wherein two valves supplying gas fuel to primary and a secondary mixing zones have different valve trims, whereby the combination of the two valves, together with a constant flow valving system upstream and the primary and secondary nozzle characteristics downstream, can provide the required precision.

It is a further object of the invention to provide a dual gas valving system including separate valves for valving fuel gas to primary and secondary fuel gas nozzles, and wherein the two valves are ganged for operation by a single actuator.

It is a still further object of the invention to provide a dual gas valving system wherein substantially linear mutual proportioning is provided between fuel gas supplied to primary and secondary mixing zones over the operational range.

It is a still further object of the invention to combine a linear-trim gas fuel valve feeding fuel gas from a common source to one or more first fuel gas nozzles and an equal-percentage-trim gas fuel valve feeding fuel gas to a second fuel gas nozzle, and wherein the first and second valves are mechanically or electrically ganged for concerted operation.

Briefly stated, the present invention provides a coordinated valve splitter assembly having a linear trim primary valve in parallel with an equal-percentage-trim valve to split fuel gas between primary nozzles and a secondary nozzle of a gas turbine combustor. In one embodiment, coordination of the actuation of the two valves is accomplished through rigid connection of the valve shafts. Shaped-cam and electronic actuation of the two valves is also disclosed.

According to an embodiment of the invention, there is provided a gas fuel splitter for a combustor for a gas turbine engine, the combustor including at least one primary nozzle and at least one secondary nozzle, comprising: stop, speed-ratio and control valves feeding a controlled flow of the gas fuel, a coordinated valve splitter assembly, the coordinated valve splitter assembly including a primary split valve adapted to feed a portion of the controlled flow to the at least one primary nozzle, the coordinated valve splitter assembly further including a secondary split valve in parallel with the primary split valve, and adapted to feed a remainder of the flow of the gas fuel to the at least one secondary nozzle, the primary split valve and the secondary split valve including first and second different valve trims, and means for coordinating actuation of the primary split valve and the secondary split valve.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
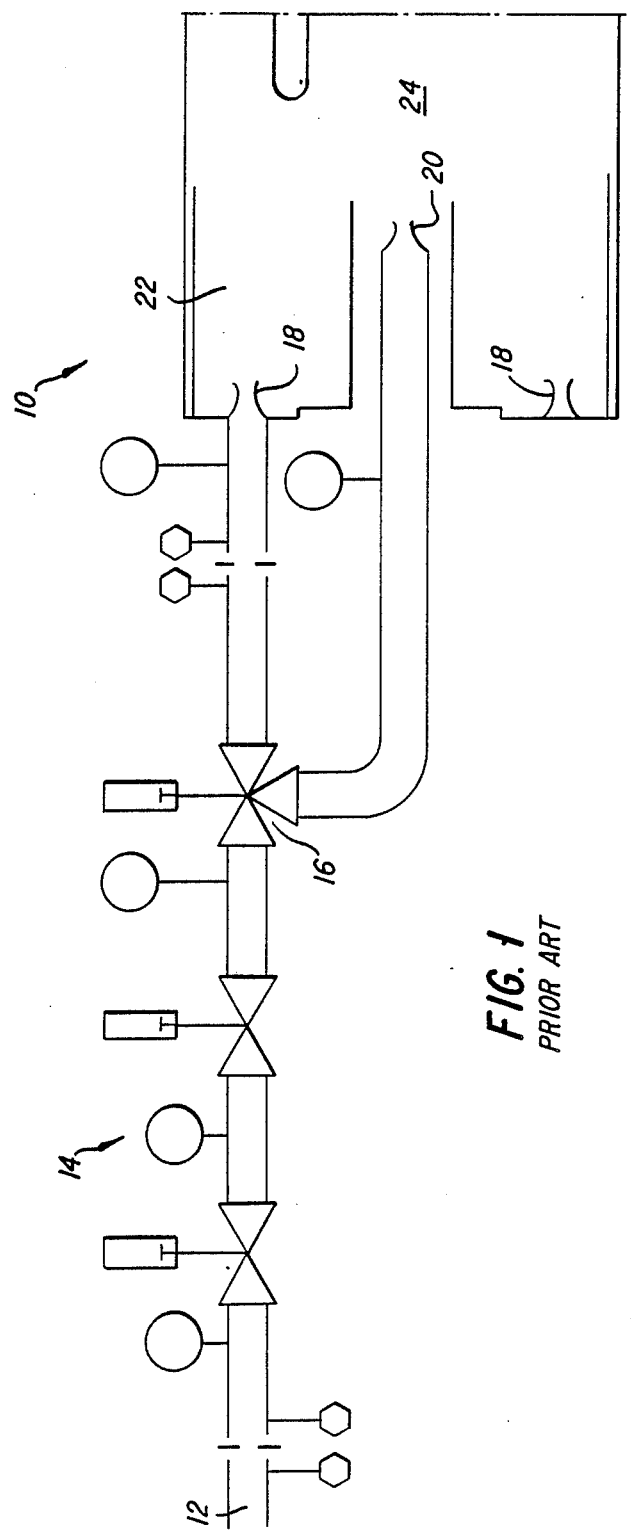
FIG. 1 is a schematic diagram of a combustor for a gas turbine engine with a conventional three-way splitter valve for proportioning a fuel gas between primary and secondary nozzles.

Referring now to FIG. 1, there is shown, generally at 10, a combustor for a conventional gas turbine system (not otherwise shown), according to the prior art. A gas-supply conduit 12 feeds fuel gas to a conventional set of stop, speed-ratio and control valves 14. A three-way splitter valve 16 proportions the fuel flow between a plurality of primary fuel nozzles 18 and a secondary fuel nozzle 20 which feed fuel gas to a primary mixing zone 22 and a secondary mixing zone 24, respectively. In addition to the elements shown, combustor 10 also includes conventional means (not shown) for feeding a controlled flow of combustion air to primary mixing zone 22 and secondary mixing zone 24, and for thoroughly mixing the fuel and air before combustion, particularly in primary mixing zone 22.

Gas-fuel premixed systems are very sensitive to changes in the split ratio between the two nozzle sets, and only provide optimum performance through a very narrow tolerance operating band.

The system of FIG. 1 has the advantage that it uses existing single stop, speed-ratio and control valves 14 whose characteristics have been exhaustively tested and are thoroughly known.

It turns out, though, that primary fuel nozzles 18 and secondary fuel nozzle 20, in common with all gas fuel nozzles, are inherently non-linear. As a consequence, the nozzle flow characteristics are the dominating factor in shaping the pressure/flow characteristics of the system. Thus, it is the task of three-way splitter valve 16 to respond and correct for the odd-shaped pressure/flow characteristics produced by the two nozzle sets. It turns out that this technique for controlling the split between primary fuel nozzles 18 and secondary fuel nozzle 20 does not attain the maximum reduction in emissions.

Figure 2:
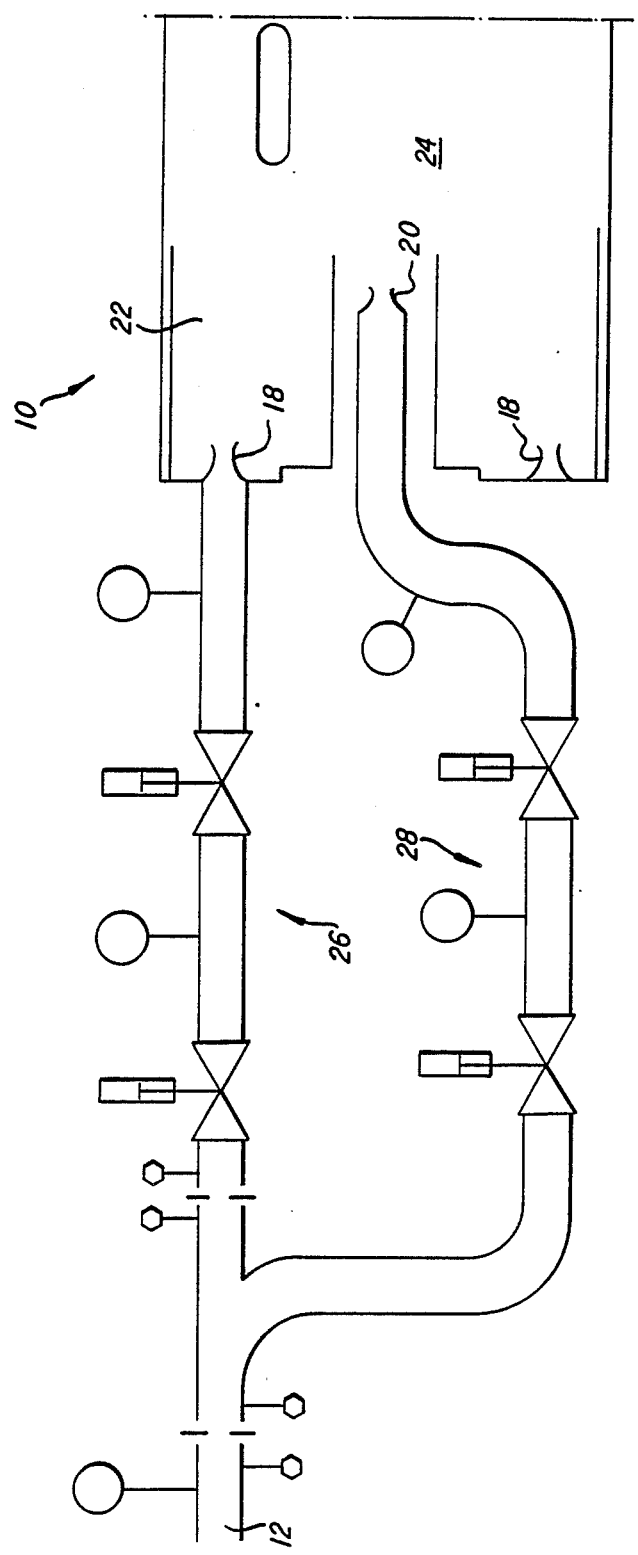
FIG. 2 is a schematic diagram of a combustor for a gas turbine engine with parallel valves and control systems for controlling proportions of a fuel gas fed to primary and secondary nozzles.

Referring now to FIG. 2, a further prior-art technique is shown for controlling the flow of fuel gas to primary fuel nozzles 18 and secondary fuel nozzle 20. Gas-supply conduit 12 feeds fuel gas to primary stop, speed-ratio and control valves 26, controlling fuel gas flow to primary fuel nozzles 18, and to secondary stop, speed-ratio and control valves 28, controlling fuel gas flow to secondary fuel nozzle 20.

The system of FIG. 2 provides a substantially linear characteristic for each control set. However, control of the split between the two nozzle sets is permanently dependent on monitoring the gas flow to the two nozzle sets. Thus, the accuracy of fuel splitting depends on the accuracy and response speed of the control systems for the two control sets. As is well known, control systems do not have instant responses, and their responses can drift with time. The speed and response-time deficiencies are severe enough to prevent operation at the desired low levels of emissions.

Besides the noted accuracy problems, a parallel system approach suffers from a large increase in control system complexity and cost. In addition, the long straight runs required for metering tubes to do the measurement constrain, and usually increase the cost of, the physical layout of the system.

Figure 3:
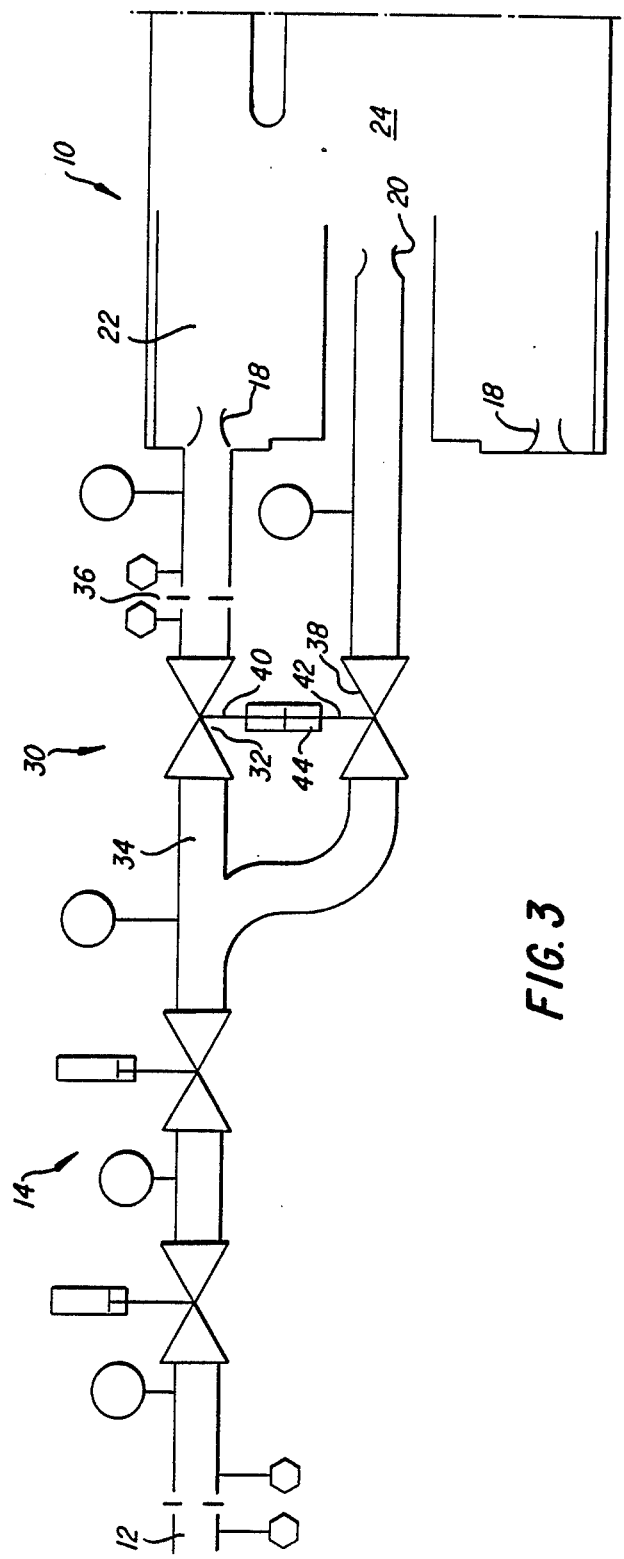
FIG. 3 is a schematic diagram of a combustor for a gas turbine engine with a pair of valves in parallel feeding fuel gas to primary and secondary nozzles of the combustor, according to an embodiment of the invention.

Referring now to FIG. 3, stop, speed-ratio and control valves 14 provide a controlled flow of gas fuel to a coordinated valve splitter assembly 30 which automatically provides for the required split of gas fuel between primary fuel nozzles 18 and secondary fuel nozzle 20. A primary split valve 32 receives gas fuel from one outlet arm of a Y conduit 34 for feeding gas fuel to primary fuel nozzles 18. A primary flow meter 36 measures the gas flow being fed to primary fuel nozzles 18. A secondary split valve 38 receives gas fuel from a second outlet arm of Y conduit 34 for feeding to secondary fuel nozzle 20. The flow of gas through secondary split valve 38 need not be measured, although such measurement may be useful, especially during development of the invention. A control shaft 40 of secondary split valve 38 is rigidly coordinated with a control shaft 42 using, for example, a rigid mechanical connection 44.

Figure 4:
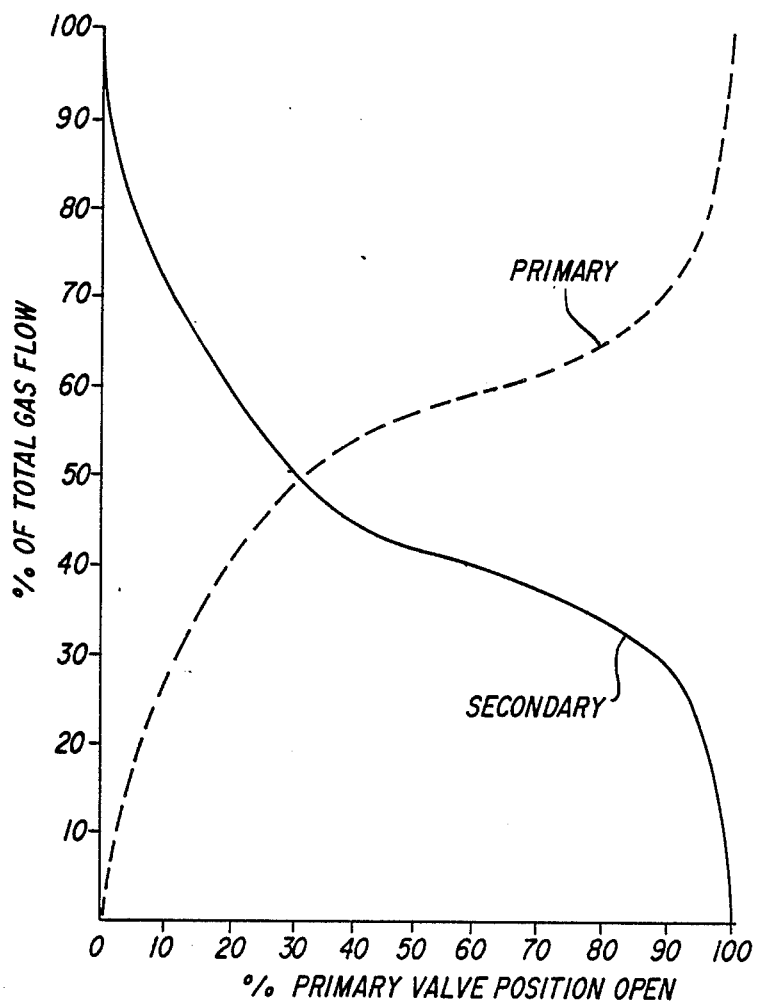
FIG. 4 is a curve showing the relationships between valve position and gas flow for linear trim valves in both positions.

The trims, or relationships between flow and valve positions, of primary split valve 32 and secondary split valve 38 are critical to satisfactory operation of coordinated valve splitter assembly 30. Calculations indicate that, if linear characteristics are chosen for primary split valve 32 and secondary split valve 38, primary and secondary gas flows, such as indicated in FIG. 4, are obtained. In the high-flow range beyond about 70 percent to primary fuel nozzle 18, which is the most important part of the range, steep slopes of the two flow curves indicate that very small amounts of valve movement produce dramatic changes in flow to the two nozzles. This results in poor controllability. Indeed, the controllability is so poor that the desired accuracy of gas split is not attained. As used herein, valve trim refers to the relationship between valve shaft position and resulting flow.

Figure 5:
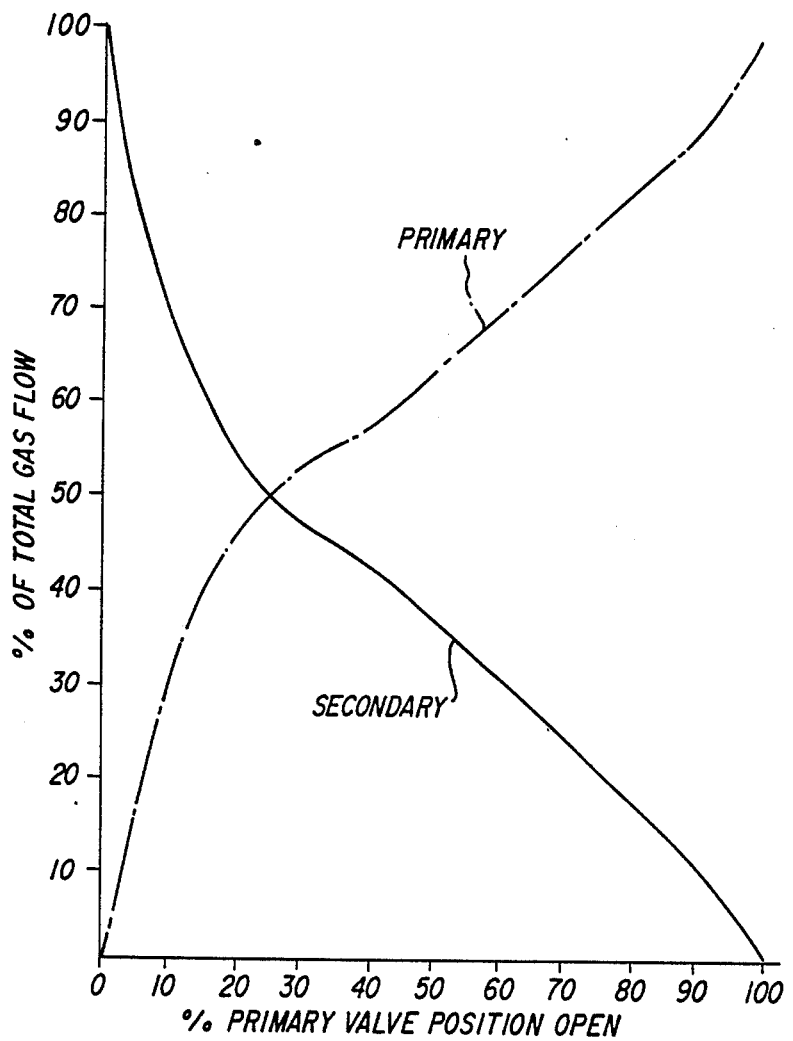
FIG. 5 is a curve showing the relationships between valve position and gas flow for a linear trim valve used for a primary splitter valve and an equal-percentage-trim valve used for a secondary splitter valve.

We have discovered that mixed valve characteristics in coordinated valve splitter assembly 30 can produce a near optimum controllable fuel split through coordinated valve splitter assembly 30. Referring now to FIG. 5, the relationships between primary and secondary flow is shown for coordinated valve splitter assembly 30 wherein primary split valve 32 is a linear-trim valve and secondary split valve 38 is an equal-percentage-trim valve. As used herein, an equal-percentage-trim valve is one in which, for equal increments of valve travel, equal percentage changes take place in the flow, given that differential pressures are equal for all conditions. That is, at low flow rates, a given change in valve position produces a small change in flow, whereas at large flow rates, the same change in valve position produces a large change in flow rate.

It will be noted in FIG. 5 that changes in flow in the interesting range beyond about 70 percent is smooth, substantially linear, and relatively shallow compared to those when linear-trim valves are used in both positions in coordinated valve splitter assembly 30.

Figure 6:
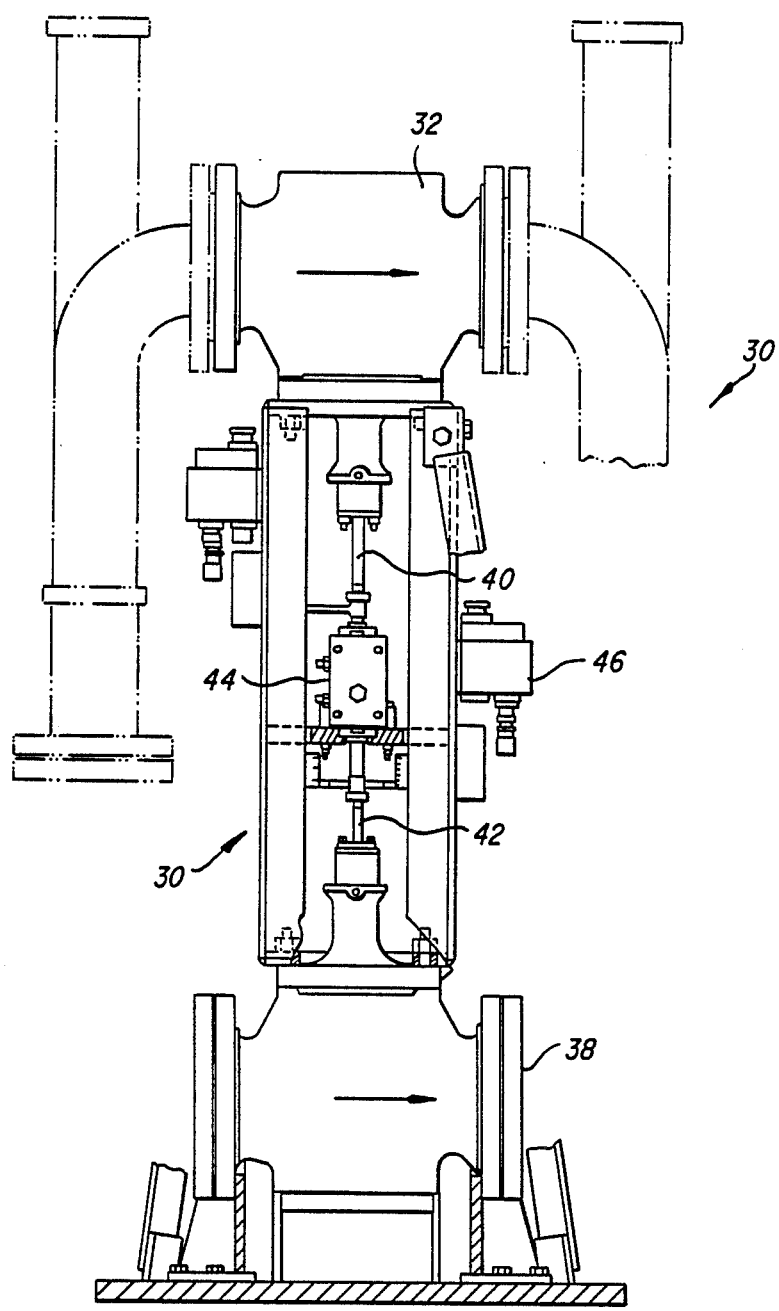
FIG. 6 is a view of one physical relationship of valves and actuator according to an embodiment of the invention.

One of the substantial advantages of coordinated valve splitter assembly 30 lies in the simplicity permitted by this concept. Referring now to FIG. 6, the simplicity of the resulting hardware is manifest. In this embodiment, rigid mechanical connection 44 is the opposed connections of control shafts 40 and 42 to shafts of a double-ended hydraulic cylinder. The double-ended hydraulic cylinder may be driven by a conventional source of pressurized fluid to displace the connected control shafts 40 and 42. A conventional position feedback device 46 such as, for example, a linear variable differential transformer, is connected to sense positions of the connected control shafts 40 and 42. The output of position feedback device 46 is fed to a conventional control system for comparing the actual position of control shafts 40 and 42 with their commanded positions. Errors in the comparison are amplified for providing pressurized fluid to the double-ended hydraulic cylinder in rigid mechanical connection 44 in a sense to reduce the error.

It would be evident to one skilled in the art that other elements may be employed to achieve results corresponding to those attained by the apparatus in the foregoing illustrative embodiment. For example, an equal-percentage-trim valve for use in secondary split valve 38 may be simulated rather than created by the valve trim itself. One way of performing such a simulation includes shaped cams actuating primary split valve 32 and secondary split valve 38. The shapes of the cams, combined with the valve trims themselves, together producing the desired set of system valve trims. Both primary split valve 32 and secondary split valve 38 may have linear trim. Cam shapes may maintain the linear trim of primary split valve 32 and simulate an equal-percentage trim in secondary split valve 38.

A further possibility may include providing individual hydraulic actuators (not shown) for control shafts 40 and 42 and an electronic control system effective for shaping the control characteristics of the hydraulic actuators to attain the equivalent of the two valve trims. From a conceptual standpoint, the direct connection of control shafts 40 and 42 through rigid mechanical connection 44 is equivalent to coordination through shaped cams and to coordination through an external electronic control circuit.

One skilled in the art will recognize that hydraulic actuators are only one of a number of equivalent sources of motive power for actuation of control shafts 40 and 42. Equivalent sources such as, for example, electric motors or pneumatic actuators should be considered to fall within the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gas fuel splitter for a combustor for a gas turbine engine, said combustor including at least one primary nozzle and at least one secondary nozzle, comprising:
   a set of stop, speed-ratio and control valves for feeding a controlled flow of said gas fuel;
   a coordinated valve splitter assembly for receiving said controlled flow;
   said coordinated valve splitter assembly including a primary split valve adapted to feed a portion of said controlled flow to said at least one primary nozzle;
   said coordinated valve splitter assembly further including a secondary split valve in parallel with said primary split valve, and adapted to feed a remainder of said flow of said gas fuel to said at least one secondary nozzle;
   said primary split valve and said secondary split valve including first and second different valve trims; and
   means for coordinating actuation of said primary split valve and said secondary split valve.

2. A gas fuel splitter according to claim 1, wherein:
   one of said first and second valve trims is a linear trim; and
   the other of said first and second valve trims is an equal-percentage trim.

3. A gas fuel splitter for a combustor for a gas turbine engine, said combustor including at least one primary nozzle and at least one secondary nozzle, comprising:
   a set of stop, speed-ratio and control valves for feeding a controlled flow of said gas fuel;
   a coordinated valve splitter assembly for receiving said controlled flow;
   said coordinated valve splitter assembly including a primary split valve adapted to feed a portion of said controlled flow to said at least one primary nozzle;
   said coordinated valve splitter assembly further including a secondary split valve in parallel with said primary split valve, and adapted to feed a remainder of said flow of said gas fuel to said at least one secondary nozzle;
   said primary split valve and said secondary split valve including first and second different valve trims; and
   means for coordinating actuation of said primary split valve and said secondary split valve, wherein said means for coordinating actuation closes said secondary split valve by the same predetermined value as a value by which it opens said primary split valve.

4. A gas fuel splitter according to claim 3, wherein said means for coordinating includes a mechanical connection between control shafts of said primary split valve and said secondary split valve.

5. A gas fuel splitter for a combustor for a gas turbine engine, said combustor including at least one primary nozzle and at least one secondary nozzle, comprising:
   a set of stop, speed-ratio and control valves for feeding a controlled flow of said gas fuel;
   a coordinated valve splitter assembly for receiving said controlled flow;
   said coordinated valve splitter assembly including a primary split valve adapted to feed a portion of said controlled flow to said at least one primary nozzle;
   said coordinated valve splitter assembly further including a secondary split valve in parallel with said primary split valve, and adapted to feed a remainder of said flow of said gas fuel to said at least one secondary nozzle;
   said primary split valve and said secondary split valve including first and second different valve trims; and
   means for coordinating actuation of said primary split valve and said secondary split valve, wherein said means for coordinating actuation closes said secondary split valve by the same predetermined value as a value by which it opens said primary split valve, and further wherein one of said first and second valve trims is a linear trim, and the other of said first and second valve trims is an equal-percentage trim.

* * * * *